United States Patent [19]

Jacobson

[11] Patent Number: 4,951,521
[45] Date of Patent: Aug. 28, 1990

[54] GIMBAL MODULE

[75] Inventor: Peter E. Jacobson, Phoenix, Ariz.

[73] Assignee: Honeywell Inc., Minneapolis, Minn.

[21] Appl. No.: 373,956

[22] Filed: Jun. 30, 1989

[51] Int. Cl.⁵ .................. F16M 11/12; F16D 1/00; B23P 11/00

[52] U.S. Cl. .................. 74/479; 29/436; 74/5.47; 248/183; 248/184; 310/42; 318/689; 403/348; 901/28

[58] Field of Search ............ 74/5.47, 479; 248/183, 248/184; 403/348, 349; 29/434, 436; 901/23, 24, 28, 29; 343/765; 318/689

[56] References Cited

U.S. PATENT DOCUMENTS

| | | | |
|---|---|---|---|
| 2,381,438 | 8/1945 | Curry, Jr. | 74/5.47 |
| 2,382,993 | 8/1945 | Haskins, Jr. | 74/5.47 |
| 2,895,339 | 7/1959 | Schroeder | 74/5.47 |
| 4,242,917 | 1/1981 | Bennett et al. | 74/5.5 |
| 4,385,577 | 5/1983 | Graham | 403/348 X |
| 4,766,777 | 8/1988 | Hartz et al. | 403/349 X |

Primary Examiner—Allan D. Herrmann
Attorney, Agent, or Firm—Howard P. Terry

[57] ABSTRACT

A gimbal module for installation in a gimbal assembly and for operation by a simple type of robot device for use in a space environment. The module has a stator, which is fixedly connected to a first gimbal, and has a coaxial rotor, which is fixedly connected to a second gimbal. The stator and first gimbal have respectively a stator spline and a gimbal spline for aligning and installing the stator in the first gimbal. The stator has a bearing which rotatably supports the rotor. The first gimbal has a bearing which rotatably supports the second gimbal. The stator and first gimbal have respective connector components. A first force is applied along the gimbal axis on the module for aligning and installing the stator and its connecotr component into the first gimbal and its connector component. The rotor and the second gimbal have respective rotor connector components. The rotor has a cam subassembly which is actuated by the robot device for applying a second force urging the connector component of the second gimbal into the connector component on the rotor.

12 Claims, 7 Drawing Sheets

GIMBAL MODULE

The present invention relates to a gimbal module, and in particular the invention relates to a plug-in gimbal module having a connector actuator.

BACKGROUND OF THE INvENTION

The prior art gimbal module includes a stator which is attached to a first gimbal and includes a rotor which is attached to a second gimbal. The module is used as a torquer and pickoff for torquing the second gimbal relative to the first gimbal and for sensing the angle of relative rotation. The stator and rotor, each is attached to its respective gimbal by screw members.

One problem with the prior art gimbal module is that it is not suitable for installation by a robotic device. The recent availability of robotics has ushered in a variety of possibilities for use to assist man or to use in hazardous environments such as space to replace him for specific tasks. Unfortunately, the robotic capabilities are such as to provide only simple movements and degrees of freedom. Robotic assembly of space components is required for some phases of some programs. One family of components which must be assembled are electro-mechanical assemblies which have a number of electrical and fiber optic connectors, mechanical drive splines, liquid coolant lines and mechanical alignment pins. This assembly must be accomplished, in some instances, with a minimum amount of visibility which greatly complicates the alignment/ engagement process for a number of connections simultaneously.

This problem is aggravated by the fact that the module or subassembly must also be removed from the host assembly. It is also necessary that this insertion and removal cycle be repeated over a given life-time of a system.

SUMMARY OF THE INVENTION

According to the present invention, a gimbal module is provided. This gimbal module can be aligned, oriented and inserted into a gimbal assembly by a robotic device and the electrical connectors and service lines thereof can be connected by the robotic device. This module comprises a stator with an axis for connection to a first gimbal, a rotor coaxial with the stator for connection to a second gimbal, spline means for axial alignment and angular orientation of the stator, and actuator means for mating electrical connectors and service lines on the rotor.

By using this module having stator spline means and rotor actuator means, the problem of not being able to use a robotic device for installation of the module is avoided.

The foregoing and other objects, features and advantages will be apparent from the following description of the preferred embodiments of the invention as illustrated in the accompanying drawings.

DESCRIPTION OF THE PREFERRED EMBODIMENT

Figure 1:
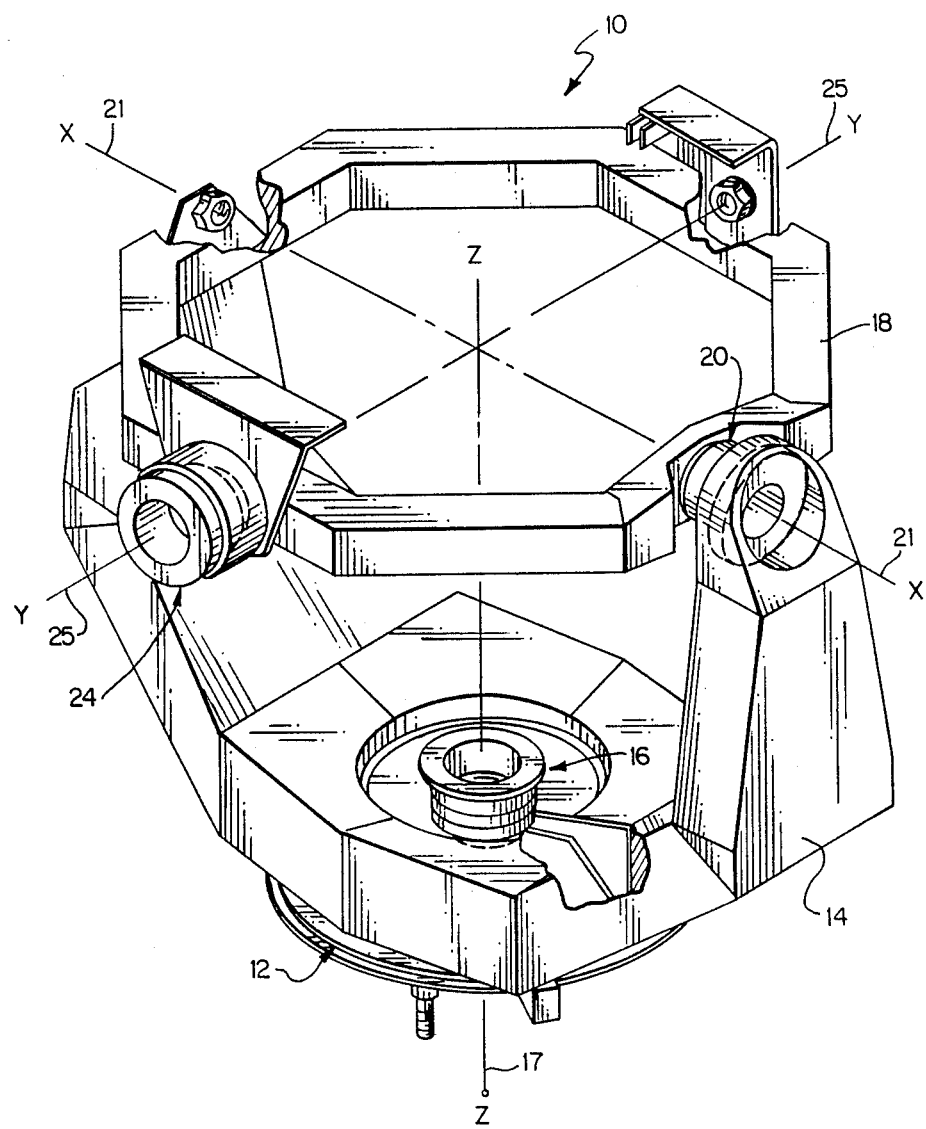
FIG. 1 is a perspective view of a gimbal assembly according to the invention.

As shown in FIG. 1, a gimbal assembly 10 is provided. Gimbal assembly 10 includes a base or first gimbal 12, a yoke or second gimbal 14, and a module 16, which has an axis 17. Gimbal assembly 10 also includes an inner gimbal or third gimbal 18, and a module 20, which has an axis 21. Assembly 10 also includes an auxiliary gimbal or fourth gimbal (not shown), and a module 24, which has an axis 25.

Figure 2:
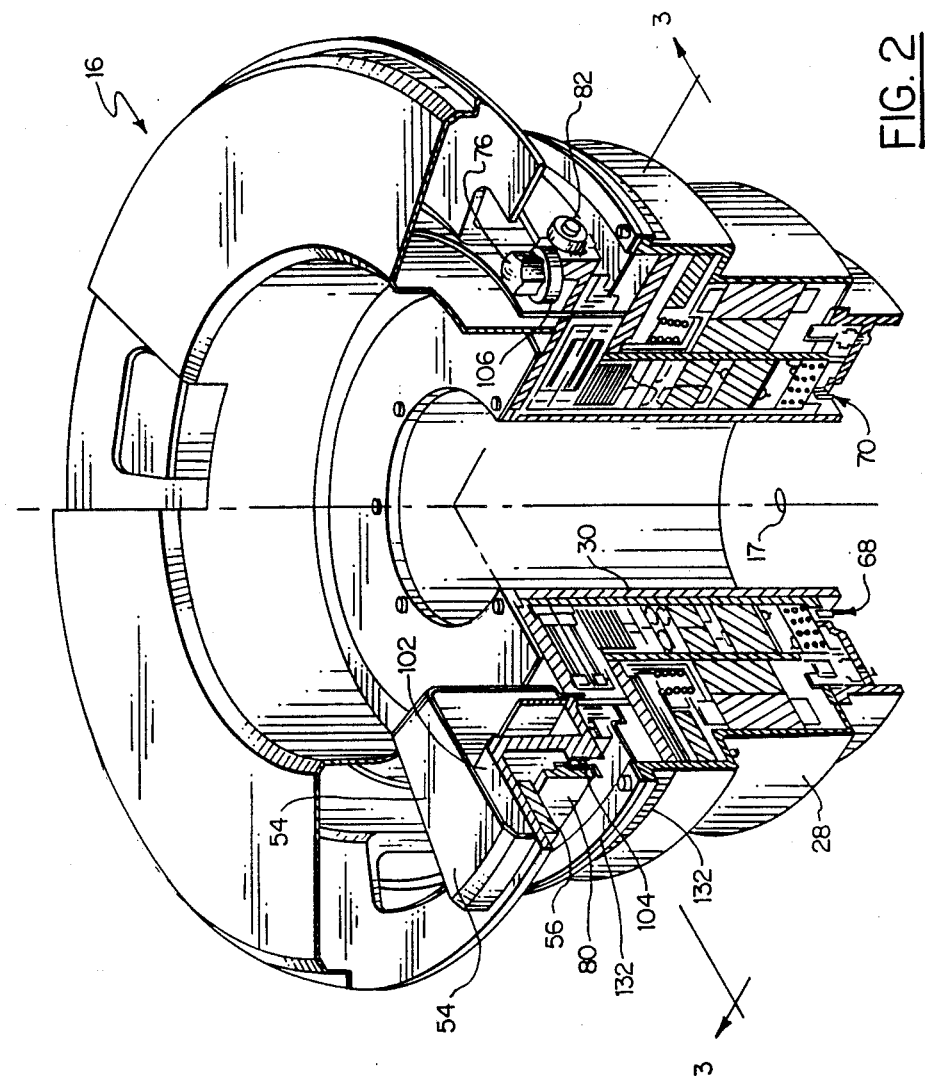
FIG. 2 is a perspective view, partly in section, of a module of the gimbal assembly of FIG. 1.
Figure 3:
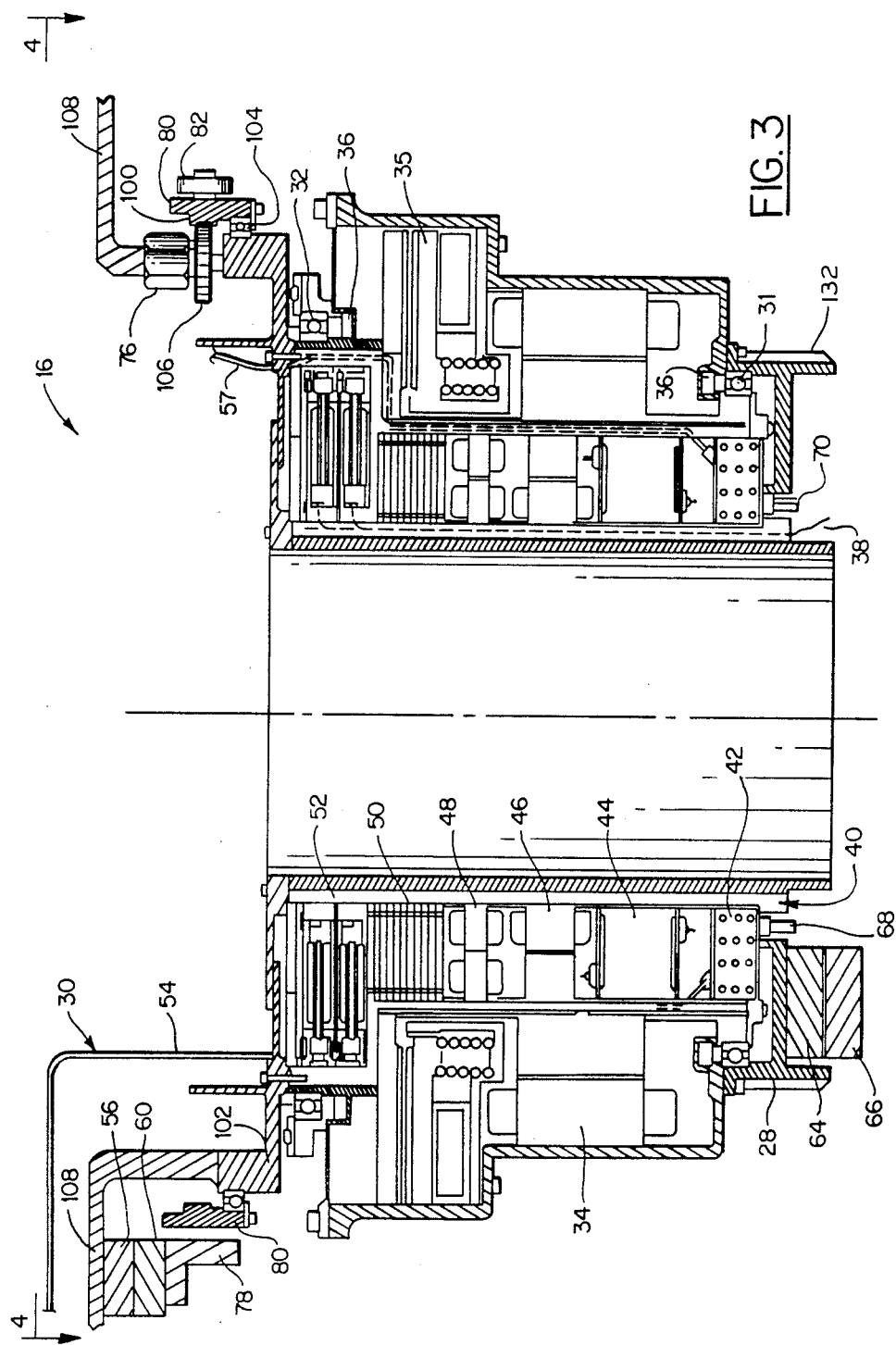
FIG. 3 is a section view as taken along line 3—3 of FIG. 2.

As shown in FIGS. 2 and 3, module 16, which is identical in construction to modules 20 and 24, includes an engagement means 26, (FIG. 5) for operation by a robotic device. Module 16 includes a stator 28, and a rotor 30, which can rotate through an angle relative to stator 28. Stator 28 has a lower ball bearing 31 and an upper ball bearing 32, both of which support rotor 30. Stator 28 also has a motor 34 for rotating rotor 30 through an angle, and has a brake 35 for blocking rotation of rotor 30. Both lower bearing 31 and upper bearing 32 have lubricating reservoirs 36.

As shown in FIG. 3, rotor 30 has a plurality of wires 38, which extend through wiring channel 40. Rotor 30 also has a fiber optic flex member 42 and an electrical flex member 44. Rotor 30 also has a tachometer 46 and a resolver 48. Rotor 30 also has a roll ring signal transfer unit 50 and a roll ring high power transfer unit 52. Rotor 30 also has a wiring harness enclosure 54.

Figure 7:
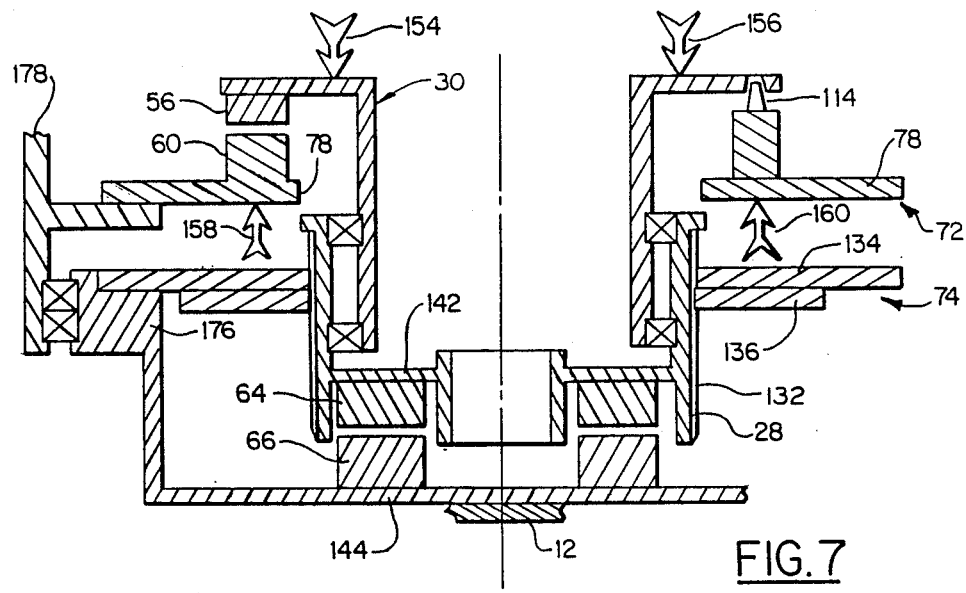
FIG. 7 is a schematic section view corresponding to FIG. 3.
Figure 8:
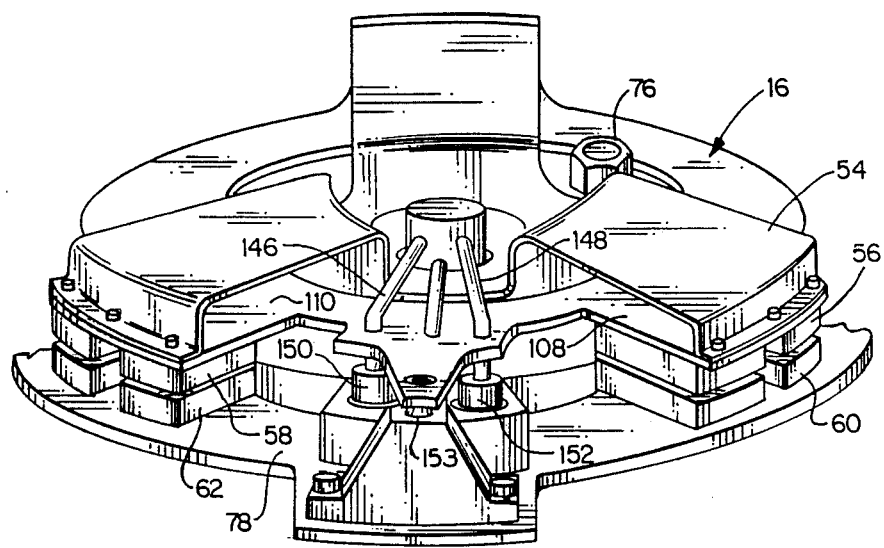
FIG. 8 is a perspective cutaway view of a portion of FIG. 2.

As shown in FIGS. 3, 7 and 8, module 16 also includes rotor connector upper components 56, 58 and rotor connector lower components 60, 62. Module 16 also includes stator connector upper component 64 and stator connector lower component 66. Fiber optic flex member 42 also has connectors 68, 70.

As shown in FIGS. 2 through 8, engagement means 26 includes a rotor connector actuator 72, and stator connector assembler 74. Actuator 72 includes a hex nut or drive component or hex handle 76, which is used to position, align, orient, and connect module 16 into base 12 and yoke 14.

Figure 4:
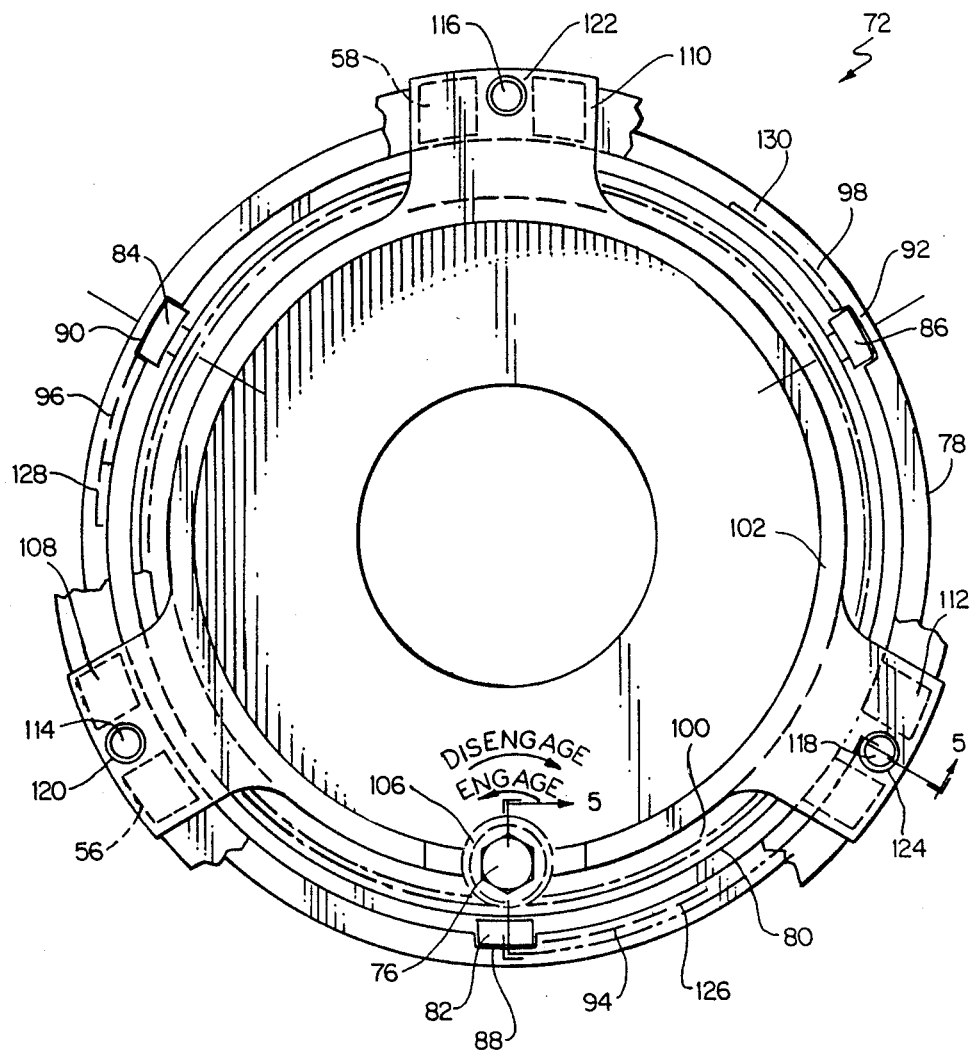
FIG. 4 is an elevation view as taken along axis 17 of FIG. 2 without sectioning.

As shown in FIG. 4, actuator 72 also includes an axially displaceable cam ring 78, and an angularly displaceable gear ring 80, which drives cam ring 78. Cam ring 78 has three cam bearings or cam rollers or engagement rollers 82, 84, 86 which are respectively received in three end grooves or stop grooves 88, 90, 92.

As shown in FIG. 4, cam ring 78 also has three cam slots or caming slots or axially tapered locking grooves 94, 96, 98.

Ring gear 80 has internal gear teeth 100 and is supported by rotor portion 102. Ring gear 80 also has a bearing 104, which is supported by rotor portion 102, and which supports ring gear 80.

Hex nut 76 has a pinion gear or drive pinion 106, which engages gear teeth 100 for angularly displacing ring gear 80.

Rotor portion 102 has three adapter flanges or projecting portions 108, 110, 112, which have respective tapered pins 114, 116, 118, that are received in respective holes 120, 122, 124.

Cam ring 78 also has three detents 126, 128, 130, for holding or locking respective rollers 82, 84, 86 in an assembled position of cam ring 78.

Figure 5:
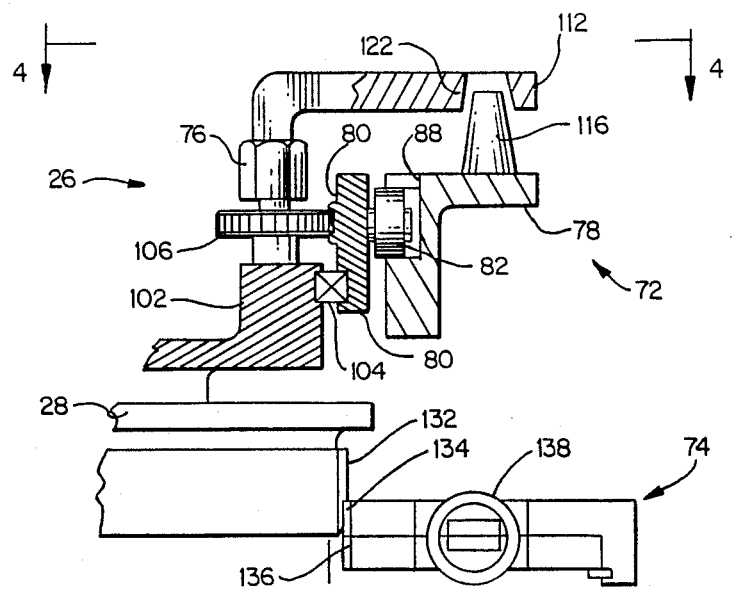
FIG. 5 is a section view as taken along the line 5—5 of FIG. 4.
Figure 6:
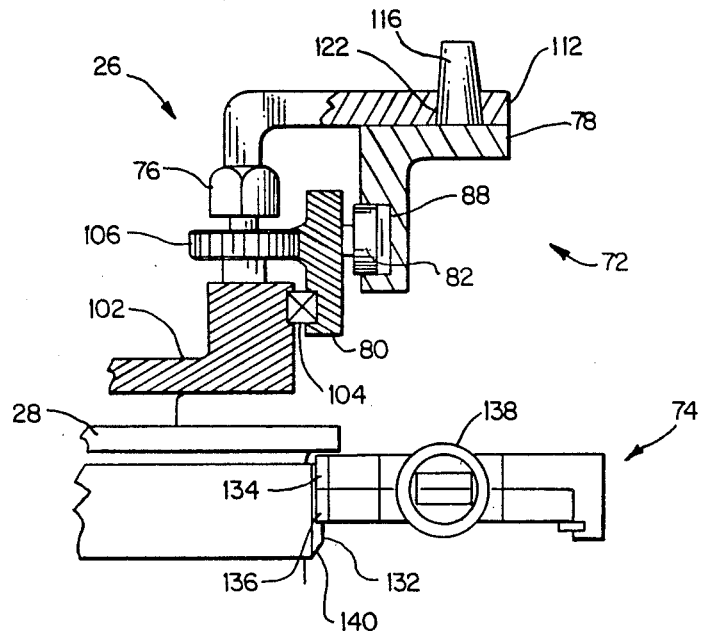
FIG. 6 is a section view like FIG. 5 after movement thereof.

As shown in FIGS. 5, 6 and 7, stator connector assembler 74 includes a stator spline 132, which is disposed on the exterior surface of stator 28. Spline 132 provides axial alignment of module 16 with base 12 and yoke 14, and also provides angular orientation or clocking of module 16 about the axis 17. Assembler 74 also has a first female spline 134 and a second female spline 136, which have a preload spring 138. Stator spline 132 has a lead-in taper 140 for initial connection of stator spline 132 to female splines 134, 136. Spline 132 forces splines 134, 136 to be loaded against one another by compression caused by preload spring 138.

As shown in FIGS. 3, 7 and 8, actuator 72 and assembler 74 cause connector components 56, 58 to be respectively assembled to connector components 60, 62, and also cause connector component 64 to be assembled to connector component 66.

As shown in FIG. 7, stator 28 has a stator adapter plate 142, and base 12 has a base adapter plate 144.

As shown in FIG. 8, module 16 also has coolant or service lines 146, 148, and has coolant or service fittings 150, 152, and has an extra alignment pin 153.

As shown in FIG. 7, insertion forces 154, 156 are applied to module 16 in order to assemble components 64 and 66. Actuation forces 158, 160 are applied by cam ring 78 in order to assemble components 56 and 60 and components 58 and 62 (FIG. 8).

Figure 9:
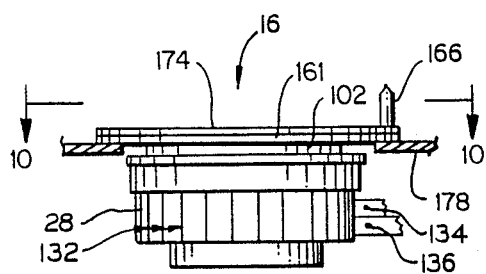
FIG. 9 is a schematic elevation view of the module of FIG. 2.
Figure 10:
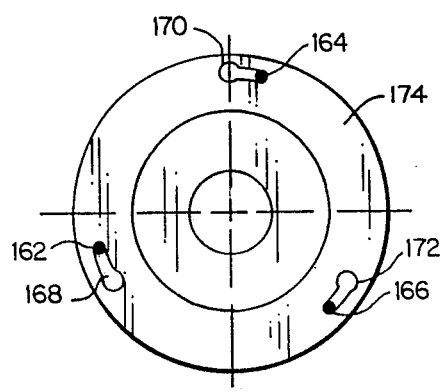
FIG. 10 is a section view as taken along the line 10—10 of FIG. 9.

As shown in FIGS. 9 and 10, module 16 has a bottom ring 161, which is fixedly attached to rotor portion 102, and has a loose top ring 174. Adapter plate 178 has three lock pins 162, 164, 166. Ring 161 sits on plate 178. Ring 161 has three round holes (not shown), which fit over pins 162, 164, 166 at a selected angular position of module 16. Such holes (not shown) and respective pins 162, 164, 166 are coded and sized to angularly position module 16. Top ring 174, which is a lock ring, has three lock holes 168, 170, 172, which are each sized to fit over the thickest one of pins 162, 164, 166. Holes 168, 170, 172, which are slotted, receive pins 162, 164, 166, which have enlarged heads or which are tee-shaped, for locking top ring 174 in position, thereby locking bottom ring 161 and module 16 in position.

Figure 11:
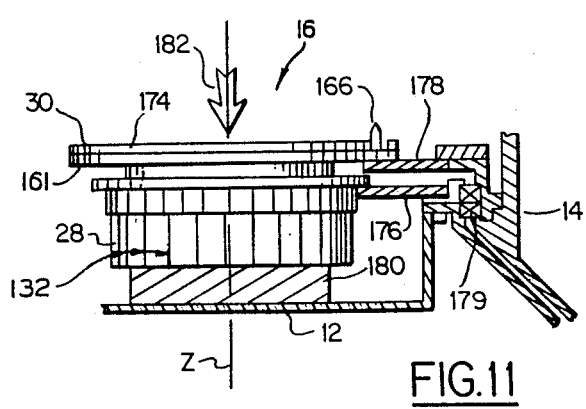
FIG. 11 is a schematic elevation view of the module of the gimbal assembly in axis "Z" of FIG. 1.

As shown in FIG. 11, module 16 is supported by adapter plates 176, 178, which are respectively supported by base 12 and yoke 14. Base 12 has a bearing means 179, which supports yoke 14. Module 16 has a connector engagement area 180 and an insertion direction 182, for assembly of module 16 into base 12 and yoke 14.

Figure 12:
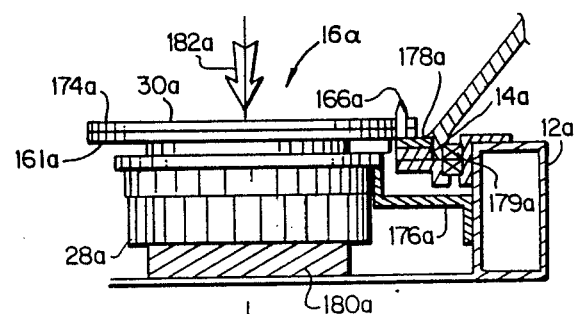
FIG. 12 is an alternate embodiment of the module of the gimbal assembly in axis "Y" of FIG. 2.

As shown in FIG. 12, which is a second embodiment of part of assembly 10, and which corresponds to FIG. 11, module 16a is provided. Parts of module 16a, which are the same as parts of module 16, have the same numerals, but with a subscript "a" added thereto.

Module 16a has adapter plates 176a, 178a, which respectively support stator 28a and rotor 30a, and which are respectively supported by outer gimbal 12a and inner gimbal 14a. Outer gimbal 12a has bearing means 179a, which support inner gimbal 14a. Module 16a also has a connector engagement area 180a and an insertion direction 182a.

Figure 13:
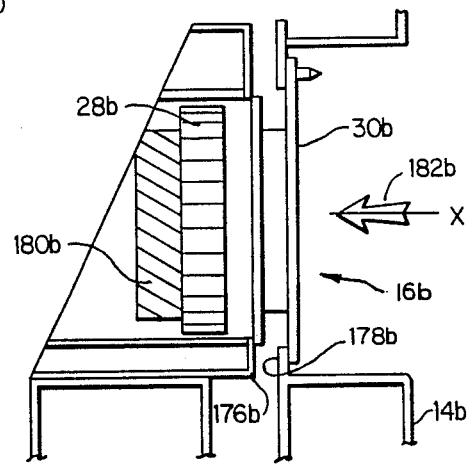
FIG. 13 is another alternate embodiment of the module of the gimbal assembly in axis "X" of FIG. 12.

As shown in FIG. 13, which is a third embodiment of part of assembly 10, and which corresponds to FIG. 11, module 16b is provided. Module 16b has adapter plates 176b, 178b, which respectively support stator 28b and rotor 30b, and which are respectively supported by first gimbal 12b and second gimbal 14b. Module 16b also has a connector engagement area 180b, and an insertion direction 182b.

In operation, referring to FIG. 1, which shows a typical gimbal set 10 and which requires the transfer of electrical signals and power across gimbal axes as well as optical links, liquid coolant lines and mechanical drive and angular position sensing components, the transfer module is required to perform these modes. These modules are shown for all three axes of the figure. It is noted that these modules 16, 20, 24 are self contained and configured such as to expedite their engagement and disengagement into the gimbal pairs. Since this engagement process is difficult to achieve in the space environment and is often accomplished by an extro vehicular activity, it is necessary that the alignment of the module in an angular orientation be easily achieved. Additionally, the various interconnections must be aligned in the insertion process. The engagement forces are quite high, exceeding 100 pounds in many cases, and yet do not require any significant reaction force on the operator. After assembly, the module is easily locked into position with a resultant zero, or near zero, backlash between the coupling components.

In operation, an assembly tool or robotic extension is first engaged upon the drive component (or hex nut) 76. This element becomes the handle by which the module 16 is moved into position within the gimbal set such as 12, 14 in FIG. 1. The module 16 is rotated until engagement rollers 82, 84, 86 are aligned with receiving grooves 88, 90, 92 in adapter ring 78. The spacing of the grooves 88, 90, 92 and the cam bearings 82, 84, 86 are such as to allow only one angular orientation to assure correct connector interfacing. After initial insertion the cam bearings 82, 84, 86 are forced circumferentially along axially tapered caming slots 94, 96, 98 machined into the adapter ring 78 by means of a drive ring gear 100. The gear 100 is an integral part of a cam ring 80 which is secured to the module rotor 102 by means of a bearing 104. The drive element 76 is an integral part of a drive gear 106 both of which are free to rotate in an element of the module rotor 102. After insertion of the module 16 into the gimbal pair, the hex handle 76 is rotated so as to force the cam ring 80 to rotate with respect to the rotor 102 which forces the cam bearings 82, 84, 86 to travel circumferentially along the grooves 88, 90, 92. This caming action forces the adapter flange 108, 110, 112, which is an extended integral part of rotor 102, to be driven axially toward adapter 78.

The caming force achieved during the engagement process can be quite large without imposing any axial force upon the operator by reason of the high mechanical advantage to be achieved by the gear 106 and ring gear 80 and the cam bearings and caming grooves 94, 96, 98. The adapter members 78 and 108, 110, 112 are prevented from rotating with respect to one another during the engagement process by means of the taper pin 114, 116, 118 attached to adapter 78 and matching holes machined into adapters 108, 110, 112. These taper pins 114, 116, 118 also provide a near zero backlash drive coupling between the module rotor adapter 108, 110, 112 and the gimbal adapter 78.

It is also noted that machine detents 126, 128, 130 in the ends of the locking cams 94, 96, 98 lock the cam bearings 82, 84, 86 into position. The entire engagement process can be achieved smoothly and uniformly without risk of jamming interconnect components.

As the module 16 is axially forced into engagement into the gimbal 14 a spline 132 on the outer perimeter of the stator 28 engages a female spline 134. This spline is preloaded in an angular sense to a second female spline 136 by a preload spring 138. As the axial engagement progresses, the external spline 132 forces the two internal splines 134 and 136 to be loaded against one another by means of compression imparted to the splines 134, 136. This insertion and loading process is assisted by the lead-in taper 140 on the external spline 132.

The disengagement process is achieved by rotating the hex handle 76 in the opposite direction which achieves a high axial force extraction without imposing any cocking moments or axial reaction forces on the operator.

Since the adapter members 108, 110, 112 and the rotor 30 and stator 28 respectively are angularly aligned during the engagement process of the module 16 into the gimbal elements 12 and 14 respectively, the various interconnect elements may be positioned so as to effect their engagement. Typical electrical connector pair components 56 and 60 are shown on the module rotor adapter 108, 110, 112 and gimbal adapter 78 respectively in FIGS. 7 and 8. In like manner, connector pair components 64 and 66 are shown on the stator adapter 142 and gimbal adapter 144 respectively in FIG. 7. A variety of mechanical connections are also possible with the concept. FIG. 8 shows how ammonia (or other fluid) coolant lines may be connected by way of suitable fittings 150 and 152. A fiber optic connector 68, 70 is shown in FIG. 3 as it would be attached to the stator adapter 142.

In summary, this invention provides a conversion from a rotational drive member 76 to a uniform axial insertion force by means of a cam driven/follower assembly 72. After insertion into a given mounting hole, a given assembly 16 to be mounted is rotated until the first of a pair of splines is engaged. This mating spline is attached to one gimbal. This initial step establishes angular clocking at a unique rotational position. Rotation of the insertion drive member 76 also drives a gear 78 and mating ring gear 80. This ring gear 80 is rotatively isolated by a bearing 104 from the main housing assembly 102 and also carries a set of two or more follower bearings 82, 84, 86 which are fitted into a slot 94, 96, 98 in the other gimbal adapter. This ramped slot is so configured as to draw the assembly into total engagement as the ring gear 80 is rotated. All electrical connectors 56, 58, 60, 62, 64, 66, pneumatic lines 146, 148, and other mechanical alignment and drive pins are engaged during this insertion process. An additional function provided at the end of the insertion process is locking of the ring gear 80 by means of a detent notch 126, 128, 130 in the cam groove 94, 96, 98.

The advantages of gimbal assembly 10 are indicated hereafter.

(a) A basic advantage of the invention is that it provides a means of aligning and inserting a gimbal drive and sensor assembly into position in which it couples two gimbals along a rotation axis.

(b) An additional advantage of the invention is that it provides a single off-axis drive means to couple multiple electrical and pneumatic connectors and mechanical drive interfaces.

(c) A further advantage is that relatively large axial engagement forces are achieved by way of a relatively low torque input on the engaging member. These large coupling forces are often necessary to properly engage the various pins, connectors, splines and interfaces of subassemblies.

(d) An additional significant advantage of the invention engagement device is the fact that the axial force is uniform throughout the interfaces as characterized by the fact that the force vectors at each engaging interface are parallel to the axis of the total module or subassembly.

(e) The present invention also provides a means of aligning and engaging and disengaging an electromechanical subassembly into a gimbal set or other system by means of a simple single manipulation device which also makes all necessary interconnections.

(f) Still another advantage of the invention is that it is suitable for use in a space environment.

(g) A still further advantage of the invention is that it is suitable for operation solely by a robotic device of a relatively simple type.

While the invention has been described in its preferred embodiments, it is to be understood that the words which have been used are words of description rather than limitation and that changes may be made within the purview of the appended claims without departing from the true scope and spirit of the invention in its broader aspects.

The embodiments of an invention in which an exclusive property or right is claimed are defined as follows:

1. A gimbal module for installation in a gimbal assembly having a first gimbal and having a second gimbal angularly displaceable about a common gimbal axis relative to the first gimbal comprising:

a stator with a stator axis for alignment with the gimbal axis;

a rotor with a rotor axis disposed coaxial with the stator axis;

a first connector having a first component mounted on the stator and having a second component mounted on the first gimbal;

spline means for aligning the stator axis with the gimbal axis and for connecting the first component to the second component;

a second connector having a third component mounted on the rotor and having a fourth component mounted on the second gimbal; and actuator means for connecting the third component to the fourth component.

2. The gimbal module of claim 1, wherein the actuator means comprises:

a rotary drive member for rotation by a robotic device and having a pinion gear;

a ring gear rotatable about the rotor axis relative to the rotor and having internal gear teeth engaging the pinion gear and having a cam roller;

a cam ring axially displaceable along the rotor axis having a cam slot receiving the cam roller;

said cam ring having a portion supporting the third component for connection of the third component to the fourth component by rotation of the rotary drive member.

3. The gimbal module of claim 2, wherein the spline includes:
   a first spline mounted on the stator at a selected angular position;
   a second spline mounted on the first gimbal at a selected angular position for angular orientation of the stator relative to the first gimbal during assembly thereof.

4. The gimbal module of claim 3, wherein the spline means includes:
   a third spline mounted on the first gimbal for engagement of the second and third splines with the first spline;
   a preload spring mounted on the third spline and attached to the second spline for causing compression forces in the second and third splines after engagement with the first spline.

5. The gimbal module of claim 4, wherein
   the first gimbal has bearing means supporting the second gimbal for angular displacement of the second gimbal relative to the first gimbal;
   the first gimbal having a first adapter plate supporting the stator; and
   the second gimbal having a second adapter plate supporting the rotor;

6. The gimbal module of claim 5, wherein
   the second adapter plate has a plurality of lock pins;
   the rotor has a portion having a plurality of oversize holes fitting over the respective pins; and
   the rotor has a lock plate having a plurality of slotted holes fitting over the respective pins, the lock plate being disposed over the rotor portion for locking the rotor to the second adapter plate.

7. A robotic actuated engagement device comprising:
   an electro-mechanical module which consists of rotor and stator drive and sense components;
   means of holding and transporting the module to engagement with a pair of gimbals;
   means of alignment and engagement of the rotor and stator with said gimbals; and
   means of axially inserting the module rotor and stator in proper orientation with the gimbals with relatively high and reactionless axial force.

8. An engagement device as recited in claim 7 further comprising:
   means of extracting the module from the gimbal pair with near zero axial reaction force.

9. An engagement device as recited in claim 7 further comprising:
   means of aligning and connecting electrical connector components on both the rotor and stator of the module to the gimbal pair.

10. An engagement device as recited in claim 7 further comprising:
    means of aligning and connecting mechanical components for connecting fiber optic connectors and fluid lines for the transfer of energy through an interface of the module and gimbal pair.

11. An engagement device as recited in claim 7 further comprising:
    means of effecting a zero backlash angular drive between the module rotor and stator and the gimbal pair.

12. A process for assembling a module with a module axis and with a stator with a stator connector component and a rotor with a rotor connector component into a gimbal assembly having a first gimbal with a first connector component and having a second gimbal with a second connector component and having a common gimbal axis, including the steps of:
    aligning the module axis with the gimbal axis;
    applying a first force parallel to the module axis urging the stator and the stator connector component respectively into engagement with the first gimbal and the first connector component; and
    applying a second force parallel to the module axis in a direction opposite to the direction of the first force urging the second connector component into engagement with the rotor connector component.

* * * * *